June 30, 1953  I. WATMAN  2,643,834

MECHANICAL SHRINK STRUT FOR AIRCRAFT LANDING GEARS

Filed Nov. 14, 1949 4 Sheets-Sheet 1

INVENTOR.
Irving Watman
BY
Charles S. Wilson
ATTORNEY.

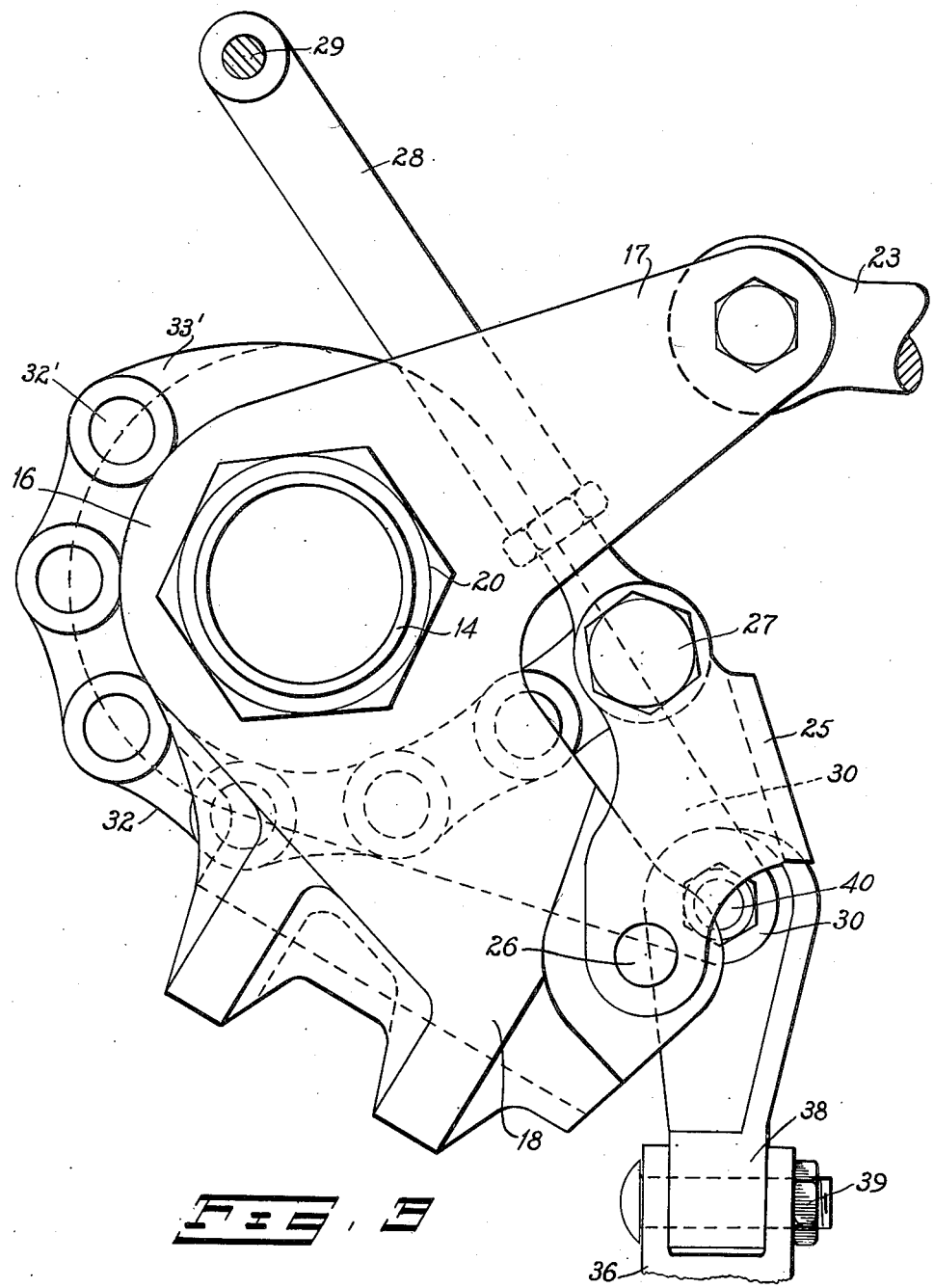

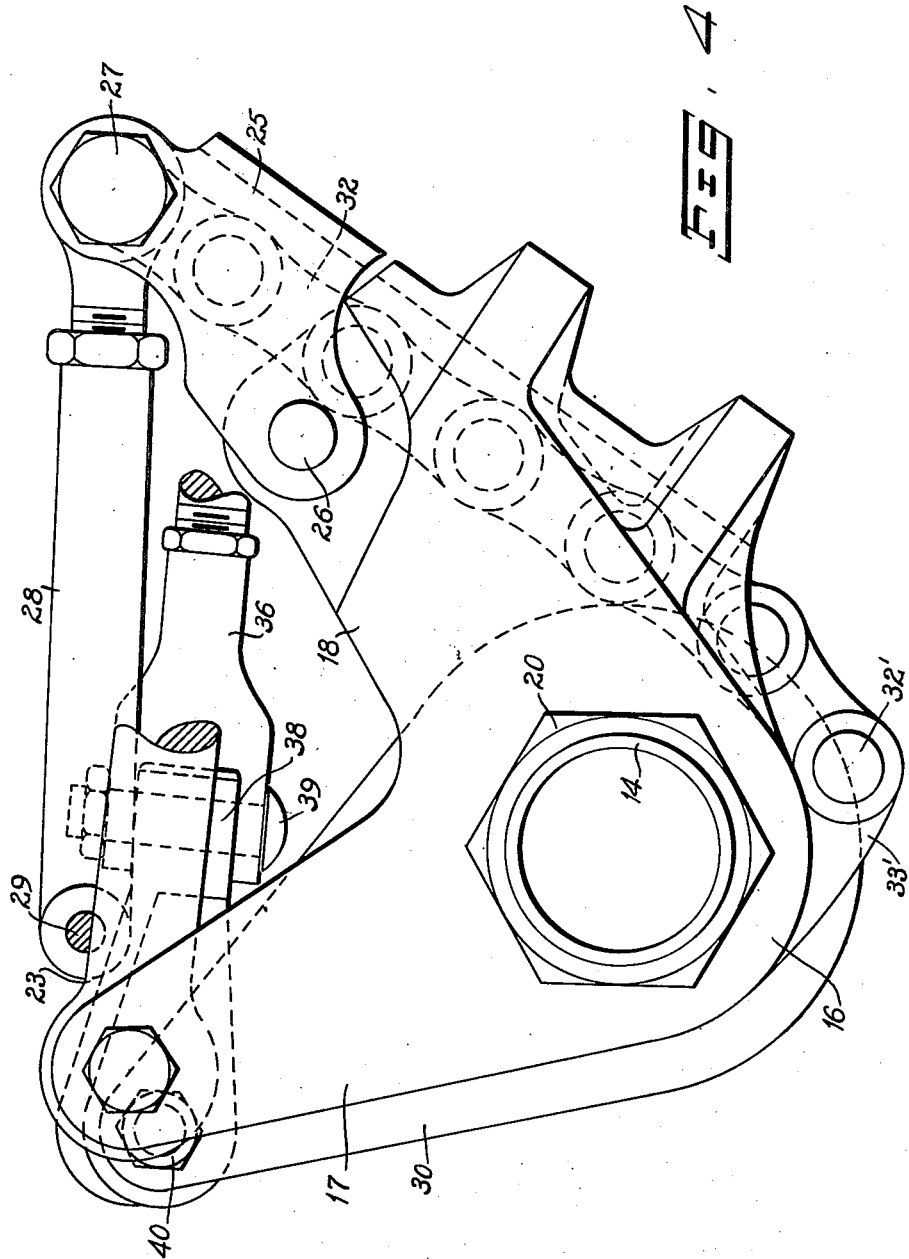

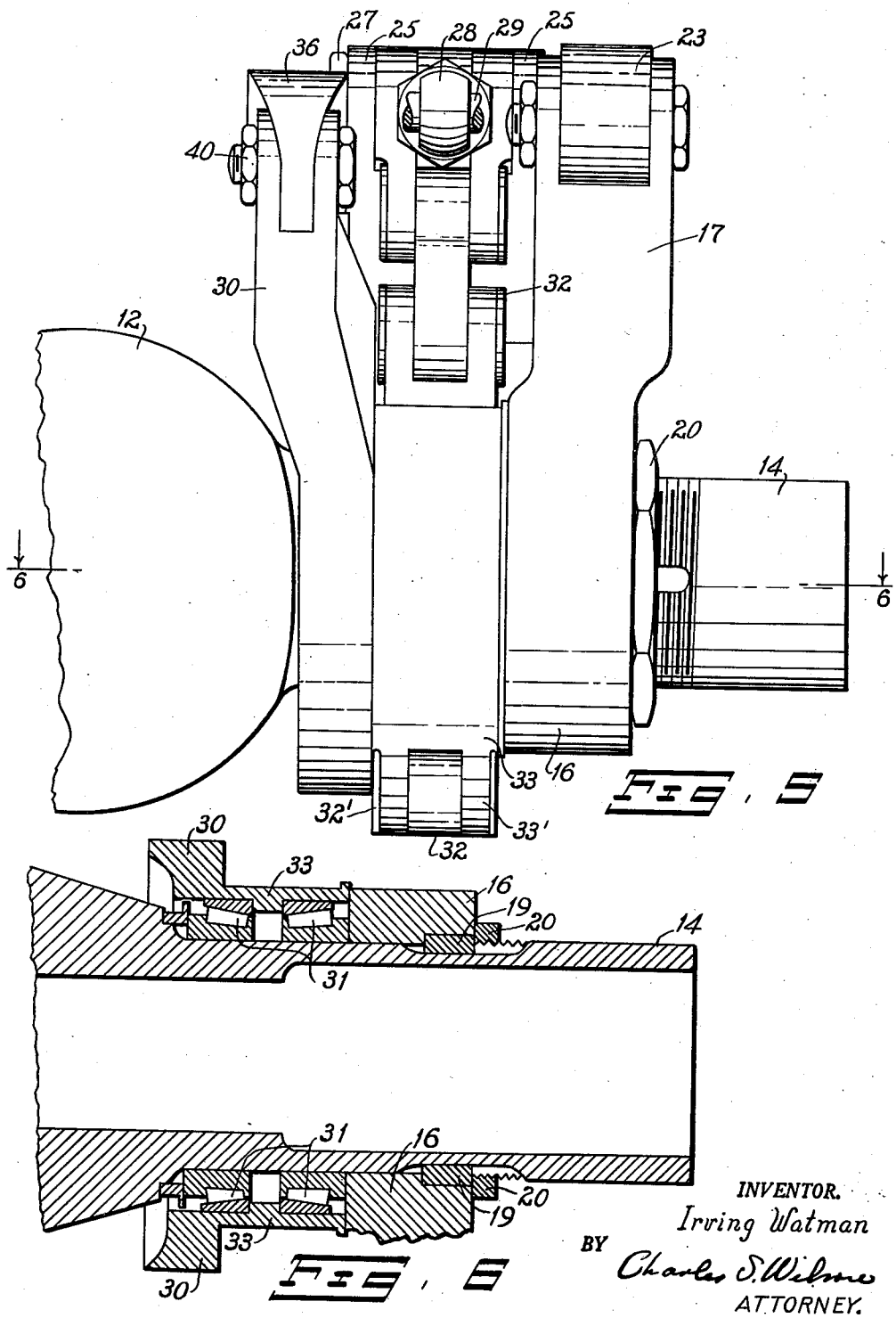

Patented June 30, 1953

2,643,834

UNITED STATES PATENT OFFICE 2,643,834

MECHANICAL SHRINK STRUT FOR AIRCRAFT LANDING GEARS

Irving Watman, Hempstead, N. Y., assignor to Republic Aviation Corporation, near Farmingdale, N. Y., a corporation of Delaware Application November 14, 1949, Serial No. 127,224

18 Claims. (Cl. 244—102)

This invention relates to landing gears for aircraft, and more particularly to landing gears of the retractable type in which the shock strut thereof may be shrunk or contracted longitudinally during the retraction of the landing gear and reversely may be extended upon the extension of the gear.

One of the important factors in the design and construction of modern aircraft, especially of the military aircraft is the maximum utilization of all space within the airframe and/or its components so as to provide for the installation of accessories, fuel cells, armament, etc. To this end, it has been found desirable to shrink or partly collapse the shock strut of the landing gear prior to or during the retraction thereof into the airframe or a component thereof such as a wing or the fuselage to thereby reduce the space required for stowing the landing gear in the aircraft or a component thereof and thus provide additional space within the frame that may be used for other purposes.

The present invention contemplates the provision of a mechanism to so shrink or contract the shock strut of a landing gear unit that it will, when retracted into or stowed in the aircraft or a component thereof, occupy minimum space or at least space appreciably less than if it were uncontracted.

Furthermore, it is proposed to employ a shrinking mechanism that is directly associated with the shock strut of the landing gear and is operated by or from the same source of power used for the extension and retraction of the landing gear unit.

The shrinking mechanism of the subject invention moreover provides for differential movement between the elements of the assembly, to the end that the limited angular movement of the shock strut required for its retraction is translated into the linear movement necessary to reduce the length of the strut for its ultimate reception in the space available for it in the aircraft or a component thereof.

With the above and other objects in view as will be apparent, this invention consists in the construction, combination and arrangement of parts all as hereinafter more fully described, claimed and illustrated in the accompanying drawings, wherein:

Fig. 3 is an elevation of the shrinking mechanism illustrating the relative positions of the parts thereof when the shock strut is extended;

Fig. 4 is a similar elevation of the same showing the relative positions of the parts of the shrinking mechanism when the shock strut is retracted;

Fig. 5 is an elevation of the mechanism from the left side of Fig. 4 showing the relative positions of the parts of the shrinking mechanism when the shock strut is retracted; and Fig. 6 is a section taken along lines 6—6 of Fig. 5 through the trunnion on which the shock strut is mounted.

Figure 2:
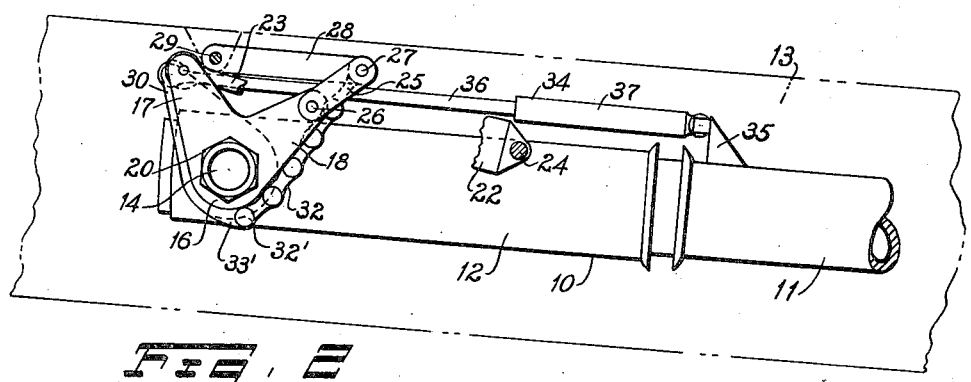
Fig. 2 is a similar view of the landing gear shock strut of Fig. 1 with its length reduced and retracted into the wing of an airplane.

Generally, an aircraft landing gear assembly comprises a shock strut adapted to be mounted at one of its ends to the aircraft frame, and having a wheel or other ground engaging means at the opposed end thereof. In order to provide for the maximum operational efficiency of the aircraft during flight, the landing gear is usually so constructed as to be retractable into the aircraft or some component thereof such as the fuselage or wing.

The shock strut normally consists of two telescoping cylinders having a shock absorbing means, such as oil or air or both, so associated therewith that the relative movement of the telescoping cylinders effectively absorbs the shocks of landing or taxiing. When on the ground, the weight of the aircraft rests on the shock strut and the inner cylinder thereof moves inwardly of the outer cylinder so that the overall length is substantially shortened. However, the shock strut in this position is not fully compressed as allowance must be made for further relative movement of the telescoping cylinders in order to provide for the absorption of any shocks that may occur while taxiing the aircraft. When the aircraft takes off, its weight is removed from the shock strut and the inner cylinder moves outwardly of the outer cylinder until the shock strut is fully extended, or reaches its maximum length.

It is apparent, therefore, that at the time when the landing gear is to be retracted, i. e., when the aircraft is airborne, its shock strut is extended and at its maximum length, and should the gear be retracted thus fully extended the space it would occupy in the airplane must be substantially greater than the space the assembly would require if its strut were collapsed or reduced in length as when in contact with the ground and supporting the weight of the airplane. As pointed out, in order to reduce the space needed to stow the landing gear assembly in its retracted position to a minimum, it has been found desirable to shrink or collapse the shock strut before stowing the landing gear within the aircraft.

This shrinking or collapsing of a shock strut has been accomplished by various means. One of said means consists of a link or brace of fixed length having one end attached to the lower cylinder of a shock strut, and the opposed end thereof pivotally mounted on the aircraft structure. In this type of shrinking mechanism, the geometrical relationship of the fixed length link or brace and the shock strut of the landing gear in its retracted and extended positions are such that upon the retraction of the gear, the fixed length link serves to collapse or shrink the shock strut. However, as the distance between the pivot about which the fixed length link or brace swings and the trunnion about which the shock strut swings, lengthens, this type of shrinking mechanism becomes increasingly objectionable because of the greater space it would then require within the aircraft or a component thereof.

Various other means have been used to collapse the shock strut of a retractable landing gear, and such means have included cylinders, electric motors and screw jacks. However, the space needed for this added equipment functioning solely to shrink the shock strut has often cancelled out or offset any space saved by shrinking the shock strut.

The instant invention, however, contemplates a compact and relatively light weight shrinking mechanism that is directly associated with a trunnion of the shock strut of the landing gear to thus restrict the space requirements to little more than is needed for the trunnion of the shock strut and the retracting mechanism without the shrinking mechanism. Furthermore, the present shrinking mechanism operates directly from the rotation of the shock strut of the landing gear on its trunnion so that no other source of power other than that required to retract and extend the landing gear is necessary. Both of the foregoing features of this mechanism contribute materially to the economy of space occupied by the retracted landing gear and the maximum utilization of space within the aircraft frame.

In general, the subject shrinking mechanism comprises a bellcrank fixedly mounted on the trunnion for the shock strut of the landing gear; a lever arm mounted for rotation independently of the bellcrank on the same trunnion; a chain and linkage system associated with the bellcrank and lever arm; and a link pivotally attached at one of its ends to the lever arm and at its opposed end to the lower section or cylinder of the shock strut. The foregoing parts are so arranged and organized, that as the bellcrank together with the trunnion is moved or rotated through a predetermined arc during the extension and retraction of the landing gear unit, the chain and linkage system cause the lever arm to rotate through an arc substantially greater than the arc travelled by the bellcrank. This differential between the rotation of the lever arm and that of the bellcrank is transmitted to the link interposed between the lever arm and the lower section or cylinder which shrinks or collapses the shock strut during the retraction of the gear assembly, or in the alternative, permits the full extension of the shock strut during the projection thereof to its extended position.

Figure 1:
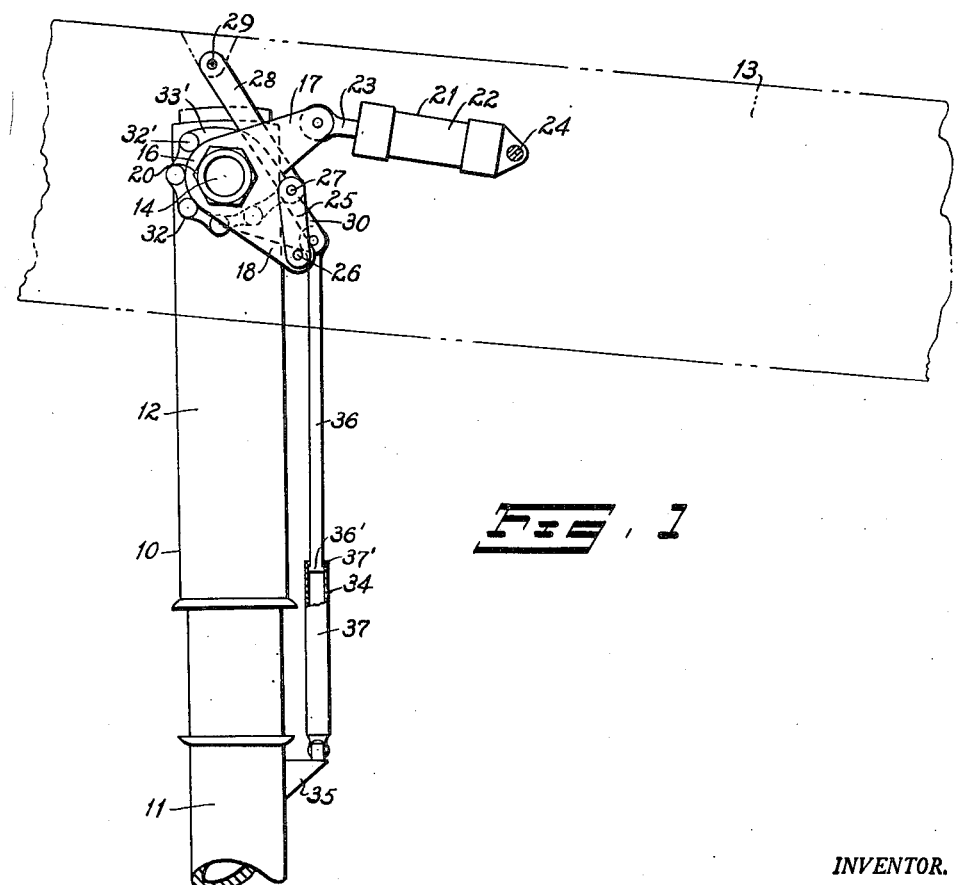
Fig. 1 is a schematic view of a landing gear shock strut in its extended position showing the present shrinking mechanism associated therewith.

Reference being had more particularly to the drawings and especially to Figs. 1 and 2, 10 designates a conventional oleo-pneumatic shock strut which comprises an inner cylinder or lower section 11 telescopingly engaged by or received in an outer cylinder or upper section 12. This shock strut 10 is pivotally attached to or mounted on the wing 13 of an aircraft by the trunnion 14, fixedly secured to the upper extremity of the outer cylinder or upper section 12 of the strut and journalled in suitable bearings (not shown) fixedly mounted within the wing structure. The construction of the shock strut 10 and the specific means by which it is attached to and carried by the wing 13 or other component of the airplane per se forms no part of the present invention, which merely requires that the shock strut 10 be collapsible or may have its length varied and that it be carried by at least one trunnion 14 so that it may swing relative to the wing 13 to be projected or extended therefrom, or that it may, in the alternative, be retracted into the space or well provided for it in the wing. Beyond these basic and essential characteristics the subject shrinking mechanism is not concerned with the details of the strut 10 or with the number and position of the trunnions 14, or with the bearings provided within the wing 13 to journal one or more trunnions 14.

A bellcrank 16 having two angularly disposed arms 17 and 18 is fixedly keyed, as at 19, to the trunnion 14 and a lock nut 20 is provided to prevent axial movement of the bellcrank on the trunnion. Any suitable motor such as the hydraulic jack 21, having a cylinder 22 and piston rod 23 supplies the power for the retraction and extension or projection of the shock strut 10 by the rotation of the trunnion 14 as will be hereinafter more fully described. This hydraulic jack 21 is positioned within the wing 13 for operative cooperation with the shock strut 10, by having one end of its cylinder 22 pivotally connected to a fixed bracket 24 situated in and secured to the structure of the wing 13, while the end of the piston rod 23 is pivotally attached to the outer extremity of the arm 17 of the bellcrank 16. Thus, when the hydraulic jack 21 is operated to expand or increase the distance between the end of the piston rod 23 and the fixed bracket 24, the force exerted thereby is applied to the arm 17 of the bellcrank 16 whereby the latter and the trunnion 14 are rotated counterclockwise (Fig. 1) to swing the shock strut 10 upwardly into the wing 13 to assume its retracted position as shown in Fig. 2. Reversely the extension or projection of the strut 10 from the position shown in Fig. 2 to that shown in Fig. 1 may be accomplished by gravity assisted by the reverse action of the jack 21 or it may be carried out entirely by the jack but in either event the rotation of the bellcrank 16 and trunnion 14 is clockwise (Fig. 1).

In order to collapse or shorten the length of the shock strut 10 during its retraction to a position within the wing 13, a mechanism is provided whereby the rotational motion of the bellcrank 16 with the trunnion 14 is utilized to produce a second rotational motion of greater magnitude, and this latter rotational motion is then translated into a linear motion that is used to collapse or shrink the shock strut.

This mechanism comprises a floating, connecting link 25, one end of which is pivotally connected to the extremity of the arm 18 of the bellcrank 16 by a pin or bolt 26, and its opposed end is pivotally connected by a pin or bolt 27 to one extremity of a reaction link 28 having a length that once it is established remains unalterable. That end of the link 28 opposed to its connection 27 with the connecting link 25 is pivotally secured by a stud or other suitable means 29 to the structure of the wing 13 and this stud is incapable of movement relative to the wing structure. When the shock strut 10 is projected from the wing 13, as shown in Fig. 1, the elements of the shrinking mechanism above described are relatively arranged as disclosed in Fig. 3. In this position of the assembly the arms 17 and 18 of the bellcrank 16 are disposed one above the other on one side of the axis of the trunnion 14 with the link 25 largely coextensive with the link 28 and with both links 25 and 28 aproximately parallel to the arm 18 of the bellcrank 16 and with the link 28 crossing the arm 17 of the latter. These approximate, relative positions of the elements are assumed when the strut 10 is fully projected and in its operative position. The actuation of the jack 21 to retract the strut 10 i. e., move or swing it from the position shown in Fig. 1 to that illustrated in Fig. 2 causes, as above pointed out, counter-clockwise rotation of the bellcrank 16 and trunnion 14 and as the trunnion 14 is fixedly connected directly to the upper section or cylinder 12 of the shock strut 10, it moves or swings the strut into its retracted position within the wing 13. During this movement the arms 17 and 18 of the bellcrank 16 swing to a position above the axis of the trunnion 14 to ultimately rest upon opposite sides of the trunnion as shown in Fig. 4. As the bellcrank 16, trunnion 14 and strut 10 travel through 90° from the projected or extended position of the strut to its retracted position, the floating or connecting link 25 swings about both pins 26 and 27 to assume a position approximately coextensive with the arm 18 of the bellcrank 16 and at an acute angle to the end of the link 28. While this is occurring the link 28 swings about the fixed stud 29 into the wing 13 where it finally comes to rest in a generally horizontal position substantially parallel to the strut 10 when it is fully retracted. (See Figs. 2 and 4).

It is to be observed that the strut 10, the bellcrank 16 and trunnion 14 always move through about 90° in the retraction or the projection of the landing gear assembly. This movement of the bellcrank 16 and its arms 17 and 18 through 90° by the jack 21 as aforesaid is also utilized to shrink or reduce the length of the strut 10 as it is retracted into the wing 13. For that purpose a lever arm 30 is loosely and oscillatingly mounted on the trunnion 14 adjacent the hub of the bellcrank 16 by suitable bearings 31. Thus the lever arm 30 may oscillate on the trunnion 14 in complete independence of the rotary movement of the trunnion 14 and bellcrank 16 in unison. A drum 33 is disposed laterally of the root end of the lever arm 30 and encircles the trunnion 14 and bearings 31. This drum 33 is either integral with the root end of the lever arm 30 or may be otherwise unitarily attached thereto. In any event the drum 33 and lever arm 30 are a single operative unit capable of independent movement relative to the trunnion 14 and bellcrank 16 and the arms 17 and 18 of the latter.

In approximate diametrical opposition to the body of the lever arm 30 the drum 33 is provided with an eccentric extension 33′ to which one end of a chain or cable 32 is pivotally attached as at 32′. This chain or cable 32 partly encircles, or bears on, the drum 33 and has its opposite end pivotally attached to the pin or bolt 27 connecting the end of the reaction link 28 to the adjacent end of the floating or connecting link 25. It will be apparent that when the strut 10 is projected from the wing 13 (Figs. 1 and 3) a greater length of the chain or cable 32 is wound on or bears against the surface of the drum 33 than when the strut 10 is retracted into the wing (Figs. 2 and 4). In the latter instance only a relative short portion of the chain or cable 32, viz., that part immediately adjoining the connection 32′ between the end of the chain or cable and the eccentric extension 33′ of the drum 33, has bearing engagement with the drum, while in the former instance a major portion of the length of the chain or cable 32 embraces and bears against the surface of the drum. From the foregoing it becomes evident that when the bellcrank 16 and trunnion 14 move in unison through 90° either a pull is exerted on the chain or cable 32 or its tension is relaxed dependent upon the direction of movement of the bellcrank. With the strut projecting and the various elements in the relative positions of Fig. 3 the movement of the bellcrank 16 through about 90° to the position of Fig. 4 exerts a direct pull on the chain or cable 32 and aligns the connecting link 25 with the arm 18 of the bellcrank 16 so that the effective length of said arm 18 is increased by the addition thereto of the connecting link 25. This pull is transmitted to the drum 33 and arm 30 and causes the independent rotation thereof on the trunnion 14. Reversely, as the bellcrank 16 moves from the position of Fig. 4 to that of Fig. 3 and the connecting link 25 resumes its position in substantial alignment or coextensive with the link 28 and nearly parallel to the arm 18 of the bellcrank 16, the pull on the chain or cable 32 is gradually eased or relaxed and the lever arm 30 and drum 33 is free to independently rotate in the reverse direction on the trunnion 14. It is this swinging or oscillating movement of the lever arm 30 on the trunnion 14 that is used to shrink or contract the strut 10 as it is retracted into the wing 13 or in the alternative, allow the strut 10 to extend as it is projected from the wing to its operative position.

In order to translate the rotational movement of the lever arm 30 on and relative to the trunnion 14 into a linear motion that may be employed to collapse or shrink the shock strut 10, a tension link 34 is interposed between the extremity of the lever arm 30 and the lower section or cylinder 11 of the shock strut, so that as the lever arm swings counter-clockwise on the trunnion 14 a pull is exerted on the lower section or cylinder 11 to telescope it into the upper section or cylinder 12 and thereby shrink or shorten the overall length of the strut. Of course when the strut 10 is projected to its operative position (Fig. 1) the sections or cylinders 11 and 12 thereof must be free to reciprocate relatively in order that the strut may absorb the shock of landing and accommodate ground irregularities encountered in taxiing. Therefore, the tension link 34 is composed of two telescoping members, to wit: the rod 36 and the hollow cylinder 37 into which the rod projects and reciprocates. These members 36 and 37 may reciprocate relatively or telescope when the strut 10 is projected and bears the load of the airplane. At that time both the strut 10 and the tension link 34 are partly collapsed or telescoped, and the components of each can move relatively. However, the moment the airplane is airborne and its load therefore removed from the strut 10 both the strut and its associated tension link 34 become fully extended. At this time the inner end of the rod 36 engages with the coacting end of the cylinder 37 and relative movement of these members is arrested so far as a pull tending to increase the length of the tension link 34 is concerned. The means by which this is accomplished is more or less conventional and is schematically shown in Fig. 1. It consists of a head 36' fixedly secured on the end of the rod 36 situated within the cylinder 37 and an inwardly projecting flange 37' at the end of the cylinder 37 which encircles, and through which the rod 36 reciprocates but this flange will not permit the head 36' of the rod to be withdrawn from the end of the cylinder. Thus when the tension link 34 is fully extended, as when the load is removed from the strut 10, the head 36' of the rod 36 contacts and bears against the inner surface of the flange 37' fixedly mounted in the end of the cylinder 37 to arrest any further outward or withdrawing movement of the rod 36 relative to the cylinder 37. Hence a pull applied to the end of the rod 36 remote from the cylinder 37 will have the operative effect of being applied to a one-piece rigid rod or to a link having a fixed length.

For cooperation with the tension link 34 a bracket 35 is rigidly attached to and projects from the lower section or cylinder 11 of the shock strut 10 and the outer end of the cylindrical member 37 of the tension link 34 is pivotally connected to this bracket. The outer end of the rod 36, viz.: the end thereof most remote from the cylindrical member 37, is pivotally secured to a clevis 38 by the pin or bolt 39 and this clevis is in turn pivoted, as at 40, to the outer extremity of the lever arm 30. Manifestly, as the lever arm 30 is rotated counter-clockwise (Fig. 3), which is when the load is off the strut 10 and the latter is being retracted into the wing 13, it applies a pull through the clevis 38 to the attached end of the rod 36. This pull is transmitted by the then relatively immovable members 36 and 37 of the tension link 34 to the bracket 35, thereby moving the lower section 11 of the strut 10 inwardly of the upper section 12 to shrink or contract the strut by reducing its overall length.

The strut 10 in being projected or retracted moves through about 90° and as the bellcrank 16 is fixedly attached to the upper section or cylinder 12 and also to the trunnion 14 of the strut it too, as well as the trunnion, will travel through approximately 90°. However, the lever arm 30, being loosely mounted on the trunnion, will swing or travel through an arc of greater length due to the alignment of the floating or connecting link 25 with the arm 18 of the bellcrank 16 to form a continuation thereof. The length of the link 25 is, therefore, a principal factor in determining the angular distance travelled by the lever 30. Thus if the link 25 is lengthened the arm 30 will travel through a greater arc and conversely if the link 25 is shortened the arc through which the arm 30 moves will be correspondingly less.

It is not to be taken that the length of the link 25 is the sole factor that enters into the determination of the relative movements of the bellcrank 16, the trunnion 14 and strut 10 on one hand, and the lever arm 30 on the other. Other factors such as the length of the lever 28, the length of the chain 32, the point at which one end of the chain is attached to the drum 33, etc., all contribute to these relative movements but, once these features are established and become set and fixed, it is the length of the link 25 that primarily determines the differential movement between the bellcrank 16 and the lever arm 30.

What is claimed is:

1. The combination with an oscillatory trunnion, of a landing gear shock strut mounted on and fixed to said trunnion for oscillation in unison therewith, a bellcrank secured to and movable with said trunnion, a power unit attached to one arm of said bellcrank the actuation of which rotates said trunnion and bellcrank and swings said strut, a connecting link pivoted to the end of the other arm of the bellcrank, a power arm loosely mounted on said trunnion for oscillating movement thereon independently of the movement of the trunnion and the bellcrank, a drum loosely encircling the trunnion to form a unitary continuation of the hub of the power arm, a reaction link pivoted at one end to a fixed pivot pin, a pivotal connection between the opposite end of the reaction link and the free end of the connecting link, a flexible member partly encircling the drum and eccentrically attached at one of its ends to the drum and at the other of its ends to the pivotal connection between the connecting link and the reaction link, and a tension link interposed between and pivoted at its ends to the extremity of the power arm and the lower end portion of the strut.

2. The combination with a hollow structural aircraft component, of a trunnion mounted for oscillation within said component, a landing gear shock strut composed of two telescoping sections with one thereof attached to the trunnion whereby the entire strut moves in unison with the trunnion, a bellcrank keyed to and movable with the trunnion, a power unit connected to one arm of the bellcrank the actuation of which operates the trunnion, bellcrank and shock strut in unison through approximately 90°, a connecting link pivoted at one of its ends to the extremity of the other arm of the bellcrank, a power arm mounted on the trunnion for independent movement relative thereto, a drum freely mounted on the trunnion and unitarily combined with that end of the power arm in engagement with the trunnion, a stud affixed to the structural component, a reaction link pivoted at one of its ends to said stud and at its opposite end to the extremity of the connecting link, a chain bearing on and eccentrically attached at one end to the drum and at its opposite end to the pivotal connection between the connecting and reaction links whereby as the trunnion, bellcrank and strut move in unison through 90° the power arm will move through more than 90°, and a tension link interposed between and pivoted at its opposite ends respectively to the end of the power arm and to the section of the strut most remote from the trunnion.

3. The combination with a hollow structural aircraft component, of a trunnion mounted for oscillation within said component, a landing gear strut composed of two sections arranged to telescope one within the other with one of said sections rigidly attached to the trunnion whereby the strut as a whole moves in unison with the trunnion, a bellcrank attached to and movable with the trunnion, a power unit connected to one arm of the bellcrank whereby the actuation of the power unit oscillates the trunnion bellcrank and swings the strut through a predetermined distance, a connecting link pivoted to the extremity of the other arm of the bellcrank, a stud fixedly secured to said structural component, a reaction link pivoted at one of its ends to said stud and at the other of its ends to the outer extremity of the connecting link, a drum loosely mounted on said trunnion, a power arm fixed to and unitary with one end of said drum and projecting normal to the axis of the drum, a flexible member bearing on the surface of the drum and eccentrically connected at one end to the drum and at the opposite end to the attachment between the connecting and reaction links whereby the power source in moving the bellcrank and its attached parts through a predetermined distance will at the same time move the power arm through a greater distance, and a connection between the extremity of the power arm and the section of the strut most remote from the section of the strut attached to the trunnion whereby the movement of the power arm relative to the trunnion telescopes the remote section of the strut relative to the section thereof attached to the trunnion.

4. The combination with a shock strut composed of two telescopic sections, of a trunnion secured to one section of said strut, a power unit, connecting means between the strut and the power unit whereby the actuation of the latter oscillates the trunnion and shock strut as a unit a predetermined distance, an operating member mounted for movement independently of the movement of the trunnion and shock strut as aforesaid, a tension connection between and attached to said operating member and the section of the strut remote from the trunnion, and a power connection associated with said operating member and said connecting means whereby the actuation of the power unit simultaneously moves said operating member a distance greater than the trunnion and strut to thereby cause the tension connection to move the section of the strut attached thereto inwardly of the section secured to the trunnion.

5. The combination with a shock strut composed of an upper section and a lower section in telescoping association therewith, of a mounting secured to the upper section of said strut to mount the strut to swing on a fixed axis through substantially 90°, a power unit so connected with the upper section of the strut that its actuation causes the strut to swing as aforesaid, a lever arm mounted to swing on the same axis as the strut, a tension member interposed between the lever arm and the lower section of the strut, and an operating mechanism connected to the lever arm and associated with the lever unit to swing the lever arm through more than 90° as the strut swings through substantially 90° upon the operation of the power unit.

6. The combination with the shock strut of a retractable landing gear consisting of an upper member and a lower member telescoped with and movable relative to the upper member and a power unit operatively associated with said upper member for retracting said shock strut by moving it a distance of predetermined magnitude, of means for reducing the length of said shock strut during its retracting movement comprising a laterally rigid, telescopic shrinking mechanism attached to the lower strut member and a differential operating mechanism connected to the shrinking mechanism and actuated by the power unit to establish a fixed ratio between magnitude of movement of the shrinking mechanism and that of the strut in being retracted.

7. The combination with the shock strut of an aircraft landing gear consisting of an upper member and a lower member telescoped with and movable relative to the upper member, of a power unit operatively connected to the upper strut member for retracting said shock strut by swinging it as a unit from its projected position to its retracted position, a laterally rigid, telescopic shrinking mechanism connected to said lower member of the shock strut, and an operating mechanism interposed between the power unit and the shrinking mechanism to establish a differential in magnitude between the movement of the strut in retracting and that of the shrinking mechanism in simultaneously moving said lower strut member inwardly of said upper strut member.

8. The combination with a sectional shock strut the sections whereof telescope and reciprocate relatively, of means for mounting said strut for swinging movement about a fixed axis, a shrinking mechanism mounted to swing about the same axis as but independently of the shock strut including a connection with the section of the strut most remote from said common axis to move said attached section inwardly of the next adjacent section upon the swinging movement of the shrinking mechanism, a power unit, a direct connection between the power unit and the shock strut whereby the actuation of the power unit swings the shock strut relative to said axis through an arc of predetermined length from its projected position to its retracted position, and an indirect connection between the power unit and the shrinking mechanism to swing the latter about said common axis through an arc of different length than that through which the shock strut swings in being retracted and thereby cause the movement of the section of the strut most remote from the said common axis inwardly as aforesaid.

9. In a retractable landing gear the combination with a shock strut composed of relatively movable, telescoping sections, of an arm, said arm and strut each being pivoted at one of its ends to swing about a fixed axis common to both strut and arm, a connection between the arm and one of the sections of the strut whereby the movement of the arm relative to said common axis in one direction causes at least one section of the strut to move inwardly of the next adjacent section to thereby reduce the length of the strut and its movement in the opposite direction permits the section of the strut moved inwardly as aforesaid to return to its original position and thereby restore the strut to its original length, a power source, a direct connection between the power source and the strut to cause the strut to swing about said common axis from a projected position to a retracted position, and an indirect connection between said power source and said arm to simultaneously swing the latter about said common axis in the direction to reduce the length of the strut.

10. In a retractable landing gear the combination with a shock strut composed of relatively movable, telescoping sections, of an arm, said arm and strut each being pivoted at one of its ends to swing about a fixed axis common to both strut and arm, a connection between the arm and one of the sections of the strut whereby the movement of the arm relative to said common axis in one direction causes at least one section of the strut to move inwardly of the next adjacent section to thereby reduce the length of the strut and its movement in the opposite direction permits the section moved inwardly as aforesaid to return to its original position and thereby restore the strut to its original length, a reciprocating power source, a bellcrank secured to one end of the strut and mounted to move concentrically to said common axis, a connection between one arm of said bellcrank and the power source to swing the strut about said common axis to its retracted position, and a connection between the other arm of the bellcrank and the root end of the aforesaid arm connected to a section of the strut whereby the latter arm may be moved to reduce the length of the strut as the strut moves to its retracted position.

11. In a retractable landing gear the combination with a shock strut composed of relatively movable telescoping sections, of a shrinking arm, said arm and strut being disposed on opposite sides of a fixed axis common to both the strut and the arm and each being mounted to swing about said common axis at one of its ends, a tension link interposed between the outer extremity of said shrinking arm and one of the sections of the strut whereby the movement of the arm relative to said common axis in one direction causes at least one section of the strut to retract by moving inwardly of the next adjacent section and thereby reduce the length of the strut, a reciprocating power source, a bellcrank mounted concentric to said common axis and rigidly secured to said strut, a connection between the power source and one arm of the bellcrank to swing the bellcrank and the strut about said common axis to move the strut to its retracted position, and a connection between the other arm of the bellcrank and the root end of the shrinking arm to move the latter in a direction to reduce the length of the strut simultaneously with the movement of the strut to its retracted position.

12. In a retractable landing gear the combination with a shock strut composed of relatively movable telescoping sections, of a shrinking arm, said arm and strut being angularly disposed relatively to a fixed axis common to both the strut and the arm and each being mounted to swing about said common axis at one of its ends, a tension link interposed between the outer extremity of said shrinking arm and one of the sections of the strut whereby the movement of the arm relative to said common axis causes at least one section of the strut to retract by moving inwardly of the next adjacent section and thereby reduce the length of the strut, a reciprocating power source, a bellcrank mounted for rotation concentrically to said common axis and rigidly secured to said strut, a connection between the power source and one arm of the bellcrank to swing the bellcrank and the strut about said common axis to move the strut to its retracted position, a connection between the other arm of the bellcrank and the root end of the shrinking arm whereby the movement of the bellcrank causes said arm to move in a direction to reduce the length of the strut simultaneously with the movement of the strut to its retracted position, and means associated with the connection between the arm of the bellcrank and the root end of said shrinking arm to cause the length of that arm of the bellcrank to increase as the shrinking arm moves to reduce the length of the strut as aforesaid and thereby increase the degree of movement of said shrinking arm relative to its axis.

13. In a retractable landing gear the combination with a shock strut composed of relatively movable telescoping sections, of a shrinking arm, said arm and strut being angularly disposed one to the other and at different angles to a fixed axis common to both the strut and the arm and one end of each being mounted to swing about and relative to said common axis, a tension link interposed between the outer extremity of said shrinking arm and one of the sections of the strut whereby the movement of said arm relative to said common axis in one direction causes at least one section of the strut to move inwardly of the next adjacent section and thereby reduce the length of the strut, a reciprocating power source, a bellcrank mounted to rotate concentrically to said common axis and rigidly secured to said strut, a connection between the power source and one arm of the bellcrank to swing the bellcrank and the strut about said common axis to move the strut to its retracted position, a connecting link pivoted to the other end of the bellcrank and disposed substantially parallel to the arm of the bellcrank when the shock strut is in its projected position, a reaction link pivotally connected to the extremity of said connecting link to move the latter into a position coextensive of the bellcrank arm as the bellcrank rotates about said common axis, and a connection between the root end of the shrinking arm and the joint between the connecting link and the reaction rod to rotate said arm on the common axis as the bellcrank is independently rotated about the same axis.

14. In a retractable landing gear the combination with a shock strut adapted to have its length varied, a shrinking arm, said shrinking arm and said strut being disposed at different angles to a common axis and one end of each being mounted for independent pivotal movement relative to said axis, a tension link between the extremity of the shrinking arm and the strut whereby the movement of said arm in one direction reduces the length of the strut, a bellcrank mounted to rotate about said common axis and rigidly attached to one end of the shock strut, power means connected to one arm of the bellcrank to thereby rotate it relative to said axis and swing the strut to its retracted position, a reaction rod arranged to swing at one of its ends about a fixed point disposed eccentrically to said common axis, a connecting link interposed between and pivoted to both the other end of the reaction rod and the other arm of the bellcrank, and a driving connection between the root end of the shrinking arm and the connecting link where the latter connects with the reaction rod to move the former to reduce the length of the strut as the strut swings to its retracted position.

15. In a retractable landing gear the combination with a shock strut adapted to have its length varied, a shrinking arm, said shrinking arm and said strut being disposed at different angles to a common axis and one end of each being mounted for independent pivotal movement relative to said axis, a tension link between the extremity of the shrinking arm and the strut whereby the movement of said arm in one direction reduces the length of the strut, a bellcrank mounted to rotate about said common axis and rigidly attached to one end of the shock strut, power means connected to one arm of the bellcrank to thereby rotate it relative to said axis and swing the strut to its retracted position, a reaction rod arranged to swing at one of its ends about a fixed point disposed eccentrically to said common axis, a connecting link interposed between and pivoted to both the other end of the reaction rod and the other arm of the bellcrank, and operating connection eccentrically attached to the root end of the shrinking arm at one of its ends and to the pivotal union between the connecting link and the reaction rod at the other of its ends.

16. In a retractable landing gear the combination with a shock strut adapted to have its length varied, a shrinking arm, said shrinking arm and said strut being disposed at different angles to a common axis and one end of each being mounted for independent pivotal movement relative to said axis, means whereby the pivotal movement of the shrinking arm relative to said axis reduces the length of the strut, a power means, a connection between the power means and the strut to swing the strut relative to said common axis to its retracted position, and means operable from the power source to impart a degree of movement of the shrinking arm relative to said common axis different from that of the pivotal movement of the strut relative to said axis.

17. The combination with a shrinkable shock strut, of a shrinking arm, one end of each being arranged to rotate independently relative to a common axis, a tension member interposed between the shrinking arm and the strut whereby the movement of the arm relative to the common axis reduces the length of the strut, a power means, a connection between the strut and the power means whereby the actuation of the latter imparts a predetermined degree of angular movement to the strut relative to said axis, and means associated with said power means to impart a different degree of angular movement to the shrinking arm relative to said axis.

18. The combination with a shrinkable shock strut, of a shrinking arm, said strut and arm being organized and arranged to rotate independently about a common axis, a tension member interposed between the outer end of the arm and the strut whereby the length of the strut decreases as the arm moves in one direction relative to said axis, a power means, an operating connection between the strut and power means whereby the actuation of the latter imparts to the strut a limited degree of angular movement about the axis, and means associated with said power means to simultaneously impart to said arm a degree of angular movement about the axis greater than the degree of angular movement by the strut about the same axis.

IRVING WATMAN.

References Cited in the file of this patent

UNITED STATES PATENTS

| Number | Name | Date |
|---|---|---|
| 2,264,923 | Waseige | Dec. 2, 1941 |
| 2,390,661 | Parilla | Dec. 11, 1945 |
| 2,567,114 | Linn | Sept. 4, 1951 |